United States Patent [19]

Prasad

[11] Patent Number: 5,102,432

[45] Date of Patent: Apr. 7, 1992

[54] THREE-STAGE MEMBRANE GAS SEPARATION PROCESS AND SYSTEM

[75] Inventor: Ravi Prasad, East Amherst, N.Y.

[73] Assignee: Union Carbide Industrial Gases Technology Corporation, Danbury, Conn.

[21] Appl. No.: 624,969

[22] Filed: Dec. 10, 1990

[51] Int. Cl.⁵ .............................................. B01D 53/22
[52] U.S. Cl. .......................................... 55/16; 55/66; 55/68; 55/158
[58] Field of Search .................... 55/16, 66, 68, 158

[56] References Cited

U.S. PATENT DOCUMENTS

| | | | |
|---|---|---|---|
| 2,617,493 | 11/1952 | Jones | 55/16 |
| 3,250,080 | 5/1966 | Garwin | 55/16 X |
| 3,792,570 | 2/1974 | Biondi et al. | 55/158 X |
| 4,104,037 | 8/1978 | Garrett et al. | 55/16 |
| 4,119,417 | 10/1978 | Heki et al. | 55/16 X |
| 4,130,403 | 12/1978 | Cooley et al. | 55/16 |
| 4,180,388 | 12/1979 | Graham et al. | 55/16 |
| 4,264,338 | 4/1981 | Null | 55/16 |
| 4,435,191 | 3/1984 | Graham | 55/16 |
| 4,478,719 | 10/1984 | Michele et al. | 55/16 X |
| 4,597,777 | 7/1986 | Graham | 55/16 |
| 4,701,187 | 10/1987 | Choe et al. | 55/16 |
| 4,781,907 | 11/1988 | Mcneill | 55/16 X |
| 4,836,833 | 6/1989 | Nicholas et al. | 55/16 |
| 4,892,564 | 1/1990 | Cooley | 55/16 |
| 4,894,068 | 1/1990 | Rice | 55/16 |
| 4,931,070 | 6/1990 | Prasad | 55/16 |
| 4,934,148 | 6/1990 | Prasad et al. | 55/16 X |
| 5,004,482 | 4/1991 | Haas et al. | 55/158 X |

FOREIGN PATENT DOCUMENTS

| | | | |
|---|---|---|---|
| 56-037004 | 4/1981 | Japan | 55/158 |
| 2-131112 | 5/1990 | Japan | 55/158 |
| 1498543 | 8/1989 | U.S.S.R. | 55/158 |

OTHER PUBLICATIONS

"Inert Gas Generation Systems for Offshore Platforms", E. R. Beaver et al., Energy Progress (vol. 6, No. 3) Sep. 1986, pp. 149-154.

"Operating Lines in Cascade Separation of Binary Mixtures", S. T. Hwang et al., The Canadian Journal of Chemical Engineering, Feb. 1965, pp. 36-37.

"Gas Separation Technology", E. F. Vansant et al., Proceedings of the International Symposium on Gas Separation Technology, Antwerp, Belgium, Sep. 10-15, 1989, Process Technology Proceedings, 8.

*Primary Examiner*—Robert Spitzer
*Attorney, Agent, or Firm*—Alvin H. Fritschler

[57] ABSTRACT

Very high purity nitrogen is produced by air separation in a three stage membrane system in which the third stage permeate is recycled to the second stage and the membrane surface area is distributed between the stages to achieve high product recovery and process performance. Other gas separations, such as argon from oxygen, can likewise be achieved by thus using a three stage membrane system.

15 Claims, 3 Drawing Sheets

THREE-STAGE MEMBRANE GAS SEPARATION PROCESS AND SYSTEM

BACKGROUND OF THE INVENTION

1. Field of the Invention

The invention relates to the production of nitrogen from air. More particularly, it relates to the production of high purity nitrogen.

2. Description of the Prior Art

Permeable membrane processes and systems have been increasingly employed in air separation operations for the production of nitrogen. In such operations, feed air is brought into contact with the surface of the membrane, and oxygen, as the more readily permeable component of air, passes through the membrane while nitrogen, the less readily adsorbable component of air, is withdrawn from the membrane system as a non-permeate product stream.

Although the fundamentals of gas separation using membranes have been known for a long time, it was not until recently that advances in membrane fabrication and packaging techniques have made membrane technology economically attractive for commercial air and other gas separations. Because of such developments and the inherent simplicity of the membrane technology, a high level of interest and activity exists with respect to gas separations in the membrane art, notably in the field of air separation applications.

Single stage hollow fiber membrane processes and systems have been developed for the production of enriched nitrogen from air. This approach has the advantage of minimizing the capital costs associated with membrane staging, fabrication, piping and the like. As the desired nitrogen purity level increases, however, product recovery decreases, and the power and membrane surface area requirements increase, thereby rendering single stage operation less desirable from an overall viewpoint.

For nitrogen product purities above about 94%, two stage membrane processes and systems are desirable as an alternative to single stage operation. In two stage operations, with oxygen as the more selectively permeable component of feed air and nitrogen as the less selectively permeable component thereof, the permeate gas from the second stage is typically recycled. The blending of the permeate gas, which is nitrogen-rich as compared to air, with the feed air to the membrane system reduces the oxygen content of the feed to the system and enhances nitrogen recovery over that obtainable using a single membrane stage. In such two-stage membrane operations, no extra machinery is required since the low pressure permeate recycle from the second stage is returned to the suction side of the feed gas compressor. Such two-stage membrane operation is illustrated in "Inert Gas Generation Systems for Offshore Platforms", Beaver and Graham, Energy Progress, Vol. 6, No. 3, September, 1986, pp. 149–154, particularly FIG. 3 on p. 151.

Two stage membrane systems are commonly employed to produce nitrogen product at purity levels of from about 97% to about 99.9%, with 98% nitrogen product being a typical product of such membrane operations. At high nitrogen purities above 99%, however, two stage membrane systems tend to become quite expensive. Thus, more power and increased membrane surface area are required to produce such high purity levels at given membrane permeation pressures. Alternatively, more power and increased trans-membrane pressure are required to produce such high purity nitrogen for a given surface area membrane system. While two stage operations can be employed to produce nitrogen product at 99.99+% purity levels, as can single stage systems, the overall technical and economic feasibility of employing such one or two stage systems are diminished by the high costs of such operations at said high purity levels.

In order to achieve very high purity nitrogen product, e.g. above about 99.5%, by the highly desirable membrane approach, a two stage air separation membrane system has been integrated with a deoxo unit, in which residual oxygen in the nitrogen stream removed from the air separation membrane system is reacted with hydrogen or a fuel gas, such as methane. Such integrated membrane/deoxo systems, disclosed and illustrated in Prasad, U.S. Pat. No. 4,931,070, can be used to produce nitrogen product having a purity of up to about 99.95% or even higher, such as ultra-high purity levels on the order of about 99.999%. While such integrated two stage membrane/deoxo systems enable very high purity nitrogen product, including ultra-high purity nitrogen, to be achieved in a manner not feasible using the prior art one and two stage membrane systems referred to above, further improvement in the art is desirable in order to enable such increasingly high nitrogen purity requirements to be met on a more economically feasible basis, or without the use of hydrogen or other fuel gases.

In light of such industry requirements and expectations for the highly advantageous membrane technology approach to air separation, as well as other gas separations, attention has been directed to three stage membrane systems as an alternative to the use of a deoxo unit with two stage systems. In this regard, it is noted that three or more membrane stages have been employed heretofore in the so-called cascade separation approach to achieve enrichment of the permeate component of a feed gas mixture. For this purpose, the permeate gas separated from each membrane stage is passed as feed gas to the next succeeding membrane stage with an enriched permeate gas, e.g. oxygen in the case of air separation, being recovered from the last membrane stage. Non-permeate gas, e.g. nitrogen, is removed from each such stage. This approach, not directed to the achieving of enhanced purity levels of the non-permeate gas, is described in "Operating Lines in Cascade Separation of Binary Mixtures", Hwang and Kammermeyer, The Canadian Journal of Chemical Engineering, February, 1965, pp. 36–37.

The use of three membrane stages in air separation for very high nitrogen purity production is disclosed in "Nitrogen Production Using Membranes", Thompson, Prasad, Gottzmann and Real-Heeren, a paper presented at a symposium at Antwerp, Belgium, Sept. 10–15, 1989. FIG. 1 of said paper illustrated one, two and three stage membrane systems for the recovery of nitrogen by air separation. In the three stage system illustrated therein, feed air is passed from a feed compressor to a first stage membrane from which a more selectively permeable oxygen stream is discharged to waste, with the less permeable nitrogen stream separated therefrom being passed to the second stage. The permeate stream from said second stage is recycled for compression with additional quantities of feed air being passed to the membrane system. The second stage non-permeate gas is passed to the third stage membrane, from which very high purity nitrogen product is recovered as non-permeate gas. The oxygen containing permeate gas from the third stage is compressed and recycled for passage to the second stage membrane together with additional quantities of the first stage permeate gas.

The three stage membrane system provides a potentially desirable alternative to the use of two membrane stages, together with a deoxo unit, for the production of nitrogen at high and very high purity levels, except for production of nitrogen at ultra-high purity levels. It will be appreciated that the desirable recycle of third stage permeate gas to the inlet to the second stage membrane requires the use of an additional compressor to boost the third stage permeate gas to the desired permeation pressure level for recycle of said gas to the second stage membrane. As those skilled in the art will readily appreciate, the benefits derived from the use of the additional third stage recycle, such as higher product recovery, less membrane area and the like, must outweigh the capital and operating costs associated with providing such third stage recycle feature such as the additional compressor. There is a genuine need and desire in the art to achieve such additional benefits in an economical manner so that the inherent simplicity and advantages of the membrane approach can be further extended to the production of high purity nitrogen from air without the need for combining the membrane system employed with a deoxo unit or any other such means for achieving such high purity levels.

It is an object of the invention to provide a membrane process and system for the production of nitrogen at high and very high purity levels from air.

It is another object of the invention to provide an improved process and system utilizing three or more membrane stages for the production of high and very high purity nitrogen by air separation.

It is a further object of the invention to provide a membrane process and system for the separation of air and the production of high and very high purity nitrogen without the need for incorporating a deoxo unit therewith.

With these and other objects in mind, the invention is hereinafter described in detail, the novel features thereof being particularly pointed out in the appended claims.

SUMMARY OF THE INVENTION

A membrane process and system employs three stages with recycle of the non-permeate gas from the second and third stages being recycled to the next preceding stage, with the surface area of the membrane being distributed among the three stages so as to minimize the capital and operating expenses of the overall system. Very high purity nitrogen is recovered without the necessity for employing a deoxo unit for removal of residual oxygen from the nitrogen product.

BRIEF DESCRIPTION OF THE INVENTION

The invention is hereinafter described in detail with reference to the accompanying drawings in which:

FIG. 1 is a process flow diagram illustrating an embodiment of the three stage membrane system of the invention;

FIG. 2 is a graph illustrating the effect of nitrogen product purity on nitrogen recovery for the three stage membrane systems having the optimized area distribution of the invention as contrasted with a two stage membrane system; and FIG. 3 is a graph illustrating the power and membrane surface area associated with a three stage membrane system having the optimized area distribution of the invention.

DETAILED DESCRIPTION OF THE INVENTION

The objects of the invention are accomplished by employing a three or more stage membrane process and system, without incorporation of a deoxo unit, but with optimum area distribution between the first, second and third stages so as to efficiently produce very high purity nitrogen product in excess of about 99% by air separation.

In the practice of the invention in which nitrogen is produced from air desirably in three membrane stages, compressed air is passed to membrane modules containing said stages at a feed air pressure generally in the range of from about 50 to about 300 psig, typically about 150 psig, at a temperature generally on the order of about 90° F. Oxygen gas selectively permeates the membrane material employed in said modules and is rejected at the relatively low pressure, permeate side of the membrane. The nitrogen-rich non-permeate gas is recovered, essentially at the high feed air pressure. The permeate gas from the second stage, having an oxygen concentration less than that of air is desirably recycled to the head of the plant for compression and recycle to the membrane system. Likewise, the permeate gas from the third stage, having an oxygen content less than that of the first stage non-permeate gas being fed to the second stage, is desirably recycled to the feed of said second stage. As the three stage process of the invention is able to produce nitrogen product of a high purity in excess of about 99%, i.e. including very high purities of up to about 99.99%, a catalytic deoxygenation, or deoxo, unit need not be employed in the practice of the invention as it is with two stage membrane systems for the production of very high nitrogen product purities of 99.5% or above, including ultra-high purity levels of about 99.999+%.

Figure 1:
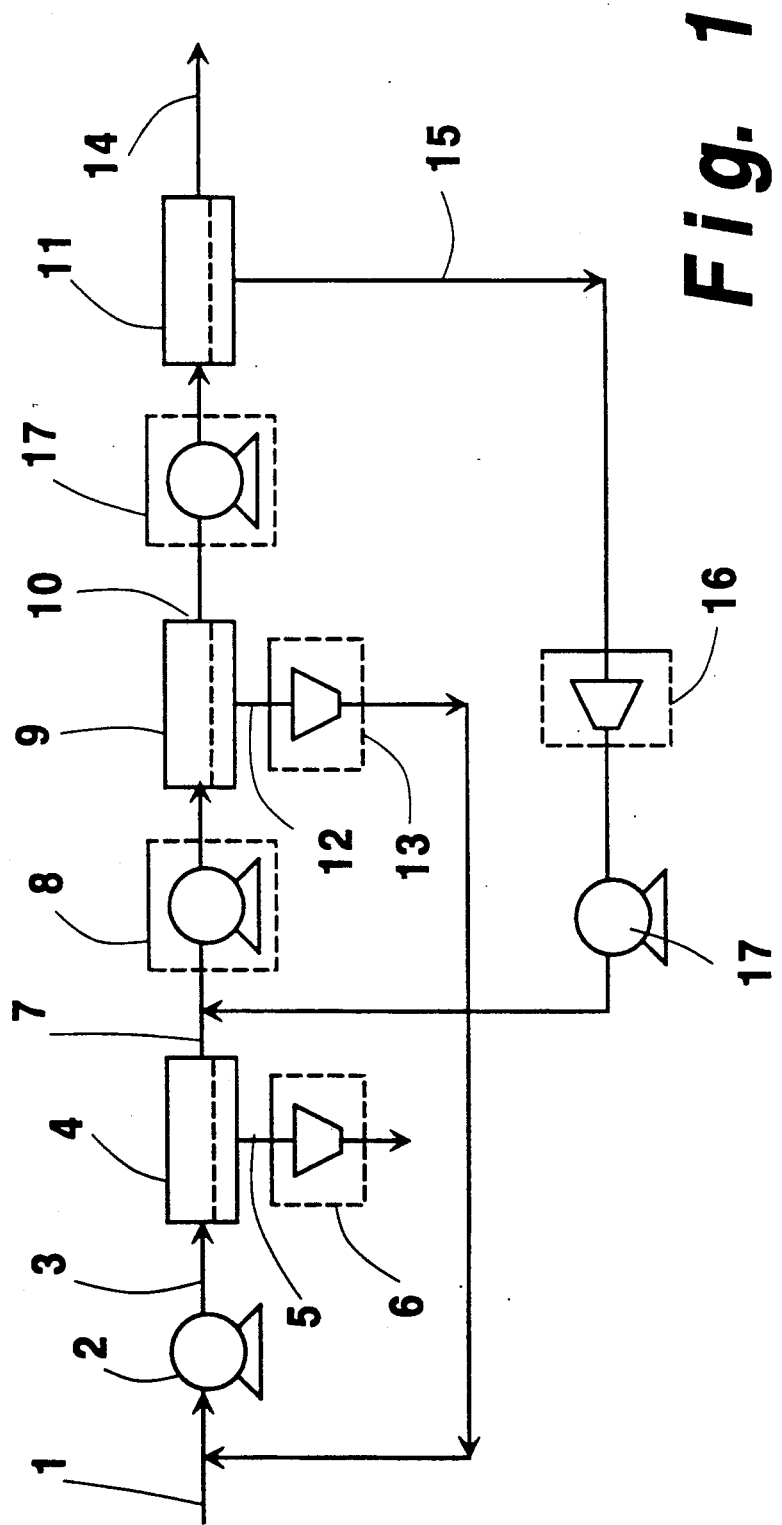

With respect to the desirable and preferred three stage system of the invention, as illustrated in FIG. 1 of the drawings, feed air is passed in line 1 to air compressor 2 from which compressed feed air is passed in line 3 to first stage membrane 4 of said three stage air separation membrane system. Permeate gas, comprising the more selectively permeable oxygen component of air, is withdrawn from membrane 4 through line 5 for discharge to waste or for use outside the system. If desired, said first stage permeate gas can be compressed in optional compressor or vacuum pump 6 for such use outside the subject membrane system. The non-permeate gas, from said membrane 4, comprising the less permeable nitrogen, is passed in line 7 to optional compressor 8, if employed depending on the operating conditions employed in a particular application, and to second stage membrane 9. The further purified non-permeate gas from membrane 9 is passed in line 10 to optional compressor 17 and to third stage membrane 11, while permeate gas from said membrane 9 is passed through line 12 and optional vacuum pump 13, if employed, for recycle to line 1 for additional compression and recycle, together with additional quantities of feed air, to first stage membrane 4. The non-permeate gas from third stage membrane 11 is recovered through line 14 as high or very high purity nitrogen product gas. The permeate gas from said membrane 11 is passed in line 15 to optional vacuum pump 16 and to compressor 17 for compression to the desired permeation pressure prior to recycle to line 7 for passage, together with non-permeate gas from the first stage membrane, to second stage membrane 9. While the non-permeate gas withdrawn from any membrane stage is essentially at the feed pressure thereto, it will be understood that the feed pressure decreases slightly from stage-to-stage in the absence of mid-stage compression.

As indicated above, practical membrane materials currently available in the art selectively permeate oxygen faster than nitrogen. As an air feed stream flows over the membrane, the concentration of oxygen in the localized permeate stream passing through the hollow fiber or other membrane configuration diminishes as the feed stream approaches the product end of the membrane. Single stage membrane systems are optimal so long as, over the entire length of the membrane, the oxygen content in the local permeate is higher than that in the feed air, i.e., so that local permeate contains less of the desired nitrogen component than is present in the feed air. Such circumstances pertain in the production of low purity nitrogen, and single stage membrane processes and systems are best suited for such applications.

As the product nitrogen purity requirement increases, however, the local permeate streams passing through the membrane near the product end start to become nitrogen enriched with respect to air. Since nitrogen is the desired product, it will be understood that any stream richer in nitrogen than air would be superior to air as a feed stream. It is desirable, therefore, to recycle all of the nitrogen-rich local permeate streams for blending with the air entering the feed compressor. In practice, this is conveniently achieved by dividing the membrane system into two stages in series, such that all of the local permeate streams in the first stage are oxygen rich, and those of the second stage are nitrogen rich with respect to air. The first stage permeate is thus discharged from the system, while the second stage permeate is recycled to the inlet of the feed compressor as indicated above. The characteristic that distinguishes the two stage membrane process and system from single stage operation is the presence of such a second stage permeate recycle stream. The recycle of this nitrogen rich (with respect to air) permeate stream reduces the oxygen content of the inlet gas and enhances nitrogen recovery. No extra machinery is required since the low pressure permeate gas from the second stage is blended with feed air at the feed compressor suction inlet.

If the product nitrogen purity is sufficiently high, the local permeate streams passing through the membrane near the product end of the second stage of a two stage system become nitrogen enriched with respect to the feed to the second stage. Under such circumstances, it becomes advantageous to split the overall membrane area into three stages and to recycle the permeate from the third stage, which is nitrogen rich with respect to the non-permeate or retentate from the first stage, for passage to said second stage. While the recycle of permeate from the second stage of a two stage system requires no additional compressor, the recycle of permeate gas from the third stage to the second stage of a three stage system requires, as noted above, a recycle compressor to boost the pressure of the permeate stream to that of the feed to the second stage. Because of the additional cost for such recycle compression, however, it is found that the total membrane area of the three stage system must be distributed among the membrane stages in a particular manner so that the oxygen concentration in the feed to the third stage is such as to justify the additional cost of a third stage permeate recycle compressor and the power consumption thereof. The mere providing of a third stage with recycle of permeate therefrom as shown in FIG. 1 of the drawings, is not by itself adequate, therefore, to achieve a practical benefit in very high purity nitrogen production operations. Rather, the area distribution between the three stages must be such that the oxygen concentration in the third stage permeate is sufficiently low as compared with the oxygen concentration of the feed to the second stage membrane that the higher nitrogen product recovery obtained, together with any permissable reduction in total membrane area, outweigh the capital and operating costs associated with the third stage recycle operation.

The area distribution between the stages to achieve such benefits of three stage membrane operation has been found to be a function primarily of the product purity, the separation factor of the membrane material employed for the gas components being separated, e.g. oxygen/nitrogen for air separation, the pressure ratio across the membrane and, to a lesser extent, membrane area cost. In general, the fraction of the total membrane area in the first and second stages is found to increase with increasing separation factors, increasing pressure ratios (feed pressure/permeate pressure) and decreasing product purity requirements. For high to very high purity operations generally in the 99% to 99.9% nitrogen purity range, at typical pressure ratios of from 7.8 to 18.0, and with membrane area costs in the common range of 1.5 to 10.0 $/square foot, it was found that, as the separation factor increases, the permeate in said stages is more enriched in oxygen, and a smaller fraction of the total membrane area produces permeate that is nitrogen rich with respect to air or to the first stage non-permeate gas passing as feed to the second stage, and hence is suitable for recycle. Consequently, the fraction of the membrane surface area in the first and second stages increases as the separation factor of the membrane material increases.

In practical commercial embodiments of the air separation membrane technology as presently developed, the separation factor for oxygen/nitrogen of the commonly available membrane materials is generally in the range of from about 2 to about 12, with practical commercial embodiments of the air separation membrane typically having separation factors of from about 4 to about 8. Applying the rationale discussed above, it has been determined that, for practical commercial air separation operations employing three stage membrane systems with third stage permeate compression and recycle to the second stage, such systems having a specific area distribution between the stages should be employed for effective overall performance of the air separation operations for the production of very high purity nitrogen. From the discussion above, it will be understood that this area distribution is a function of the separation factor of the membrane material being used in a given application carried out under typical and economically feasible overall conditions. Thus, the membrane surface area of the first stage has been found to be in the range of from about 8% to about 45% at a separation factor of about 4, to an area in the range of from about 20% to about 64% at a separation factor of about 10. This reflects the indication above that the higher the separation factor, the more surface area should be provided at an early stage in the system, and that the lower the separation factor, the more the area distribution should shift to the later stage.

Similarly, the membrane surface area of the second stage has been found to be in the range of from about 10% to about 30% at a separation factor of 4 to an area in the range of from about 20% to about 30% at a separation factor of 10. For both said first and second stage distributions, the increase in the proportion of the overall surface area employed in the stage in general varies linearly as the separation factor increases from about 4 to about 10.

The area distribution for the third stage in the practice of the invention will be the difference between the total of the first and second area distributions as indicated above and the total area of the first, second and third stages. While such three stage operation is generally advantageous for very high nitrogen purity operations, when the third stage permeate is compressed and recycled to the second stage, and the overall membrane area is distributed between the stages as provided above, it should be noted that the practice of the invention is not limited solely to the use of only three stages. Thus, it is within the scope of the invention to employ three membrane stages as described herein, and, to also employ one or more additional membrane stages for further purification of the non-permeate nitrogen product or for treatment of the permeate gas removed from the system, as from the first stage of the system, and the permeate from such additional stages may be optionally recycled to the feed of preceding stages to enhance performance. In addition, it should be noted that, although the invention can be practiced utilizing membrane materials having separation factors above about 10, such materials will tend to be less desirable for use in three or more stage systems. As new, higher separation factor membrane materials are developed to the point of commercial feasibility, e.g., facilitated transport membrane materials, the higher selectivity of separation obtainable by such materials will likely tend to render unnecessary the use of three or more membrane stages to obtain high or very high purity nitrogen product at desirable product recovery levels.

Figure 2:
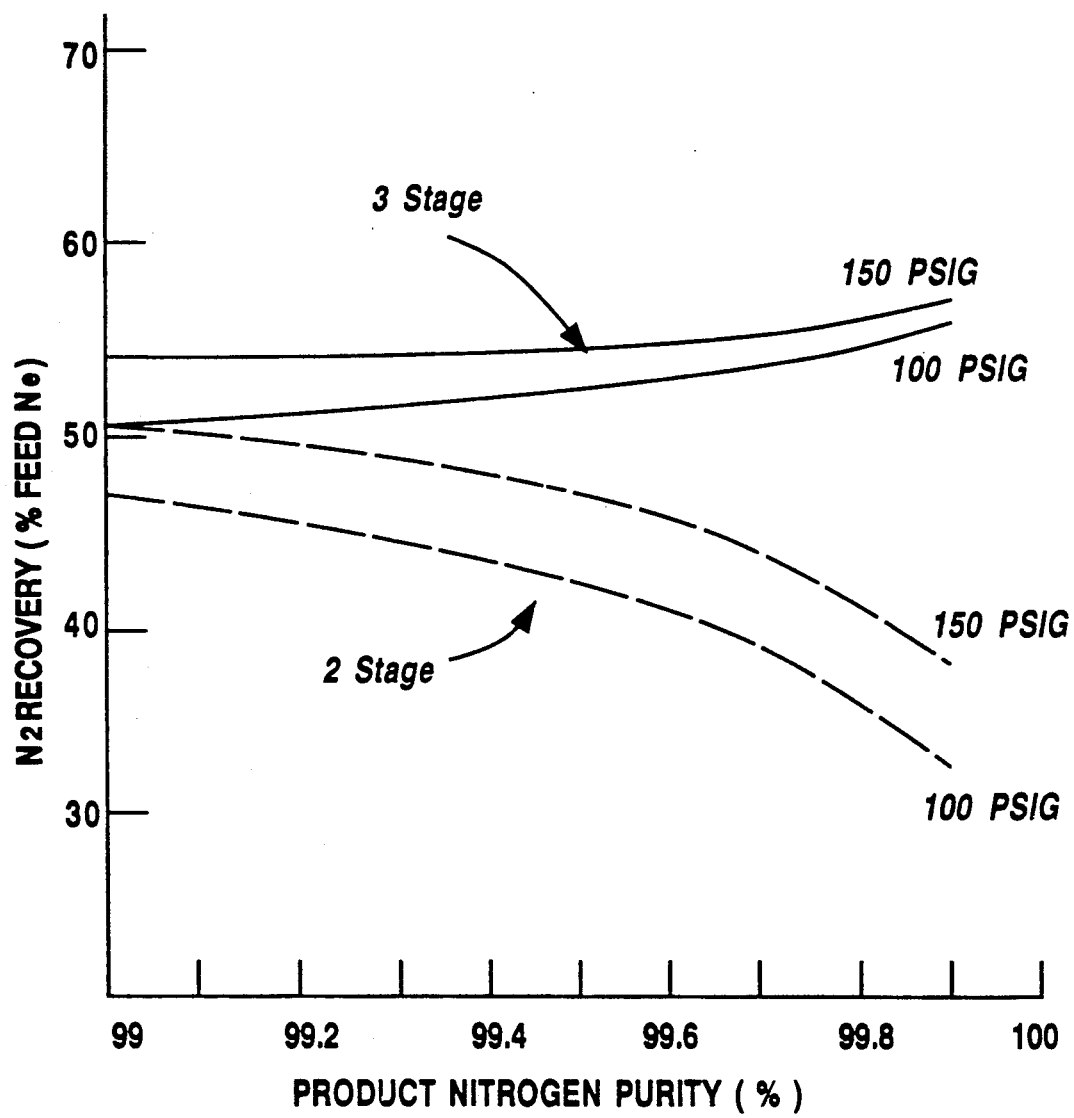

The benefits of the practice of the three stage membrane approach employing the area distribution disclosed and claimed herein vis-a-vis optimized two stage operation are illustrated in FIG. 2 of the drawings. The comparative data summarized therein was obtained based on the same composite hollow fiber membrane bundle and module configuration, and the use of a porous polysulfone hollow fiber substrate coated with a very thin separation layer having a separation factor of 6, and a permeability flux (permeability/thickness) of $3.2 \times 10^5$ barrer/cm. Feed gas pressures of 100 psig and 150 psig were investigated. As will be seen, the nitrogen recovery, measured as a % of the nitrogen in the feed air recovered as product, decreased both at 100 psig and at 150 psig for the two stage system, which provided for recycle of second stage permeate enriched in nitrogen as compared to air. Thus, the product recovery was about 46% employing the two stage system at 100 psig for the production of nitrogen at a high purity of 99%. The product recovery decreased, however, as the desired nitrogen product purity increased, with a recovery of about 32% being achieved at 99.9% purity nitrogen production. The two stage system provided for higher performance at a pressure of 150 psig, but, again, the nitrogen product recovery decreased as the product purity requirement increased. Thus, at 150 psig using the two stage system, about 51% nitrogen product recovery was obtained at the 99% purity level, with such recovery decreasing to about 38% at 99.9% nitrogen product purity.

By contrast and surprisingly, nitrogen product recovery tended to increase with increasing nitrogen product purity in the three stage operation, employing area distributions as indicated above and recycle of third stage permeate to the second stage, at both 100 and 150 psig pressure levels. Thus, a nitrogen product recovery of about 51% was achieved at 100 psig operation for 99% nitrogen purity production, with such recovery increasing to about 55% at the 99.9% nitrogen product purity level. At the higher performance levels obtainable using said 150 psig permeation pressure, nitrogen product recovery was about 54% for 99% nitrogen purity production, with said recovery increasing to about 57% at the 99.9% purity level. Thus, it will be appreciated that a substantial benefit can be achieved, in terms of desired product recovery, by using a three stage membrane system in place of a comparable two stage system, particularly as the requirement for nitrogen purity increases from 99% to about 99.9%. It will be recognized that the three stage system, on account of its high recovery, will be even more desirable in cases where the product to be recovered is more valuable than nitrogen, e.g. krypton and xenon or where the feed stream, unlike air, is not free.

Figure 3:
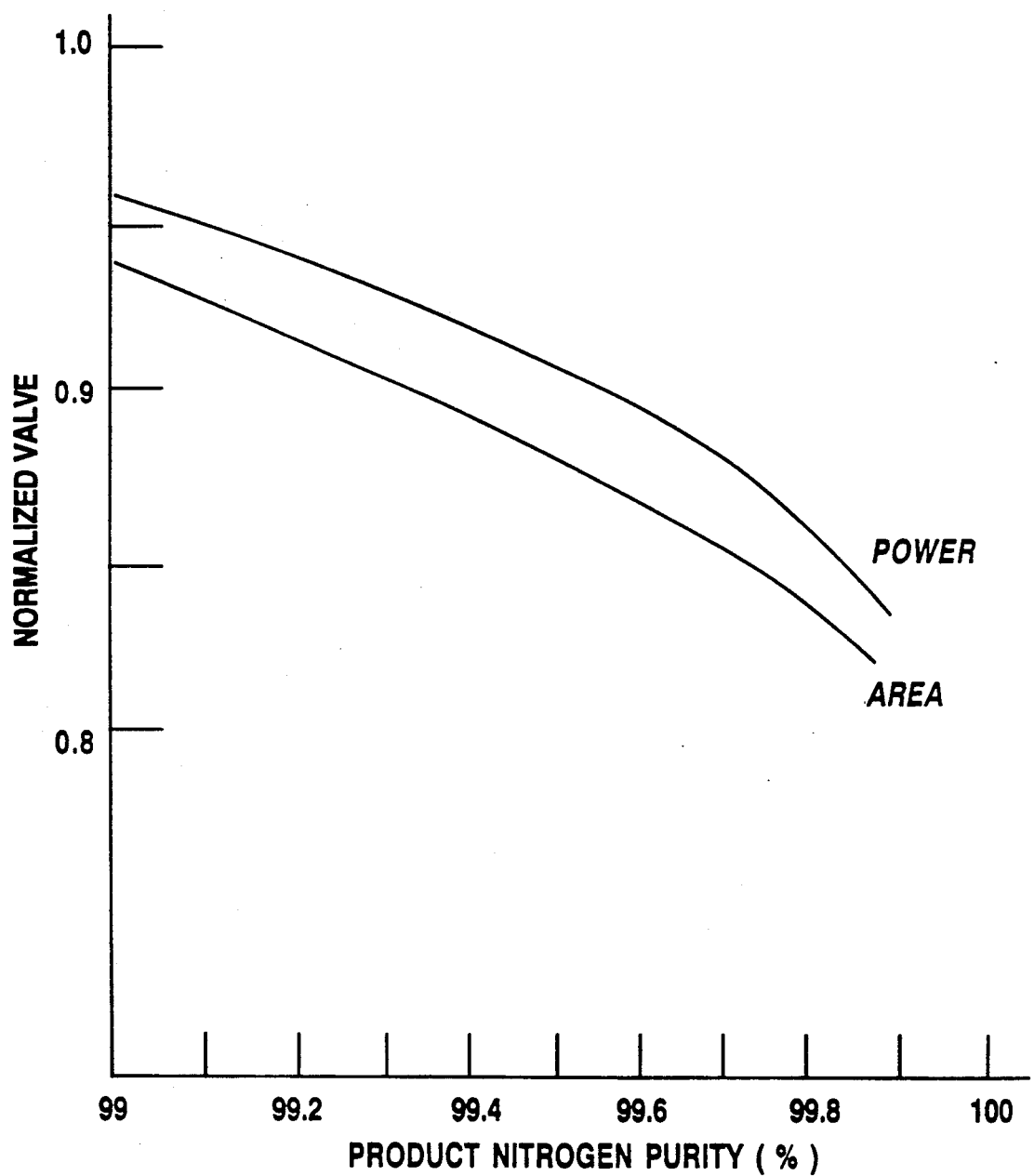

While nitrogen product recovery is an important feature of the membrane air separation operation, the membrane area and power requirements of the three stage system are likewise pertinent to an overall evaluation as to whether the benefits obtained by the inclusion of a third stage, with third stage compression and recycle to the second stage, and the area distribution of the invention are sufficient to justify such three stage membrane operation. FIG. 3 of the drawings illustrates the operation of the three stage membrane system employed in the example illustrated in FIG. 2, at 150 psig, for comparison of the membrane area and power requirements thereof with those obtainable at the same pressure level using the comparable two stage system referred to above. For this purpose, such membrane area and power requirements have, for convenience, been normalized to the optimal values for the two stage membrane system. As shown in said FIG. 3, both the membrane area and the power requirements are less for the three stage membrane process and system of the invention than for the comparable two stage system. Thus, the membrane area was found to have a normalized value of about 0.94 at the 99% nitrogen purity level as compared with a reference value of 1.0 for the two stage system at said purity level. The relative advantage of the three stage system will be seen to increase significantly as the nitrogen purity requirements increase up to the 99.9% nitrogen purity level, where the normalized value for said membrane area requirements of the three stage membrane system decreased to about 0.83. Similarly, the power requirements of the three stage system are shown to be significantly lower than those of the two stage system at the lower level of the recited purity requirement range and increase significantly at higher product purity levels. Thus, the normalized value of the power costs for the three stage system were 0.96 at the 99% purity level and decreased to about 0.83 at the 99.9% purity level. In combination with the advantageous improvement in nitrogen product recovery obtainable in the practice of the invention, the benefits with respect to membrane area and overall power requirements obtainable using the three stage membrane system as disclosed and claimed herein serve to outweigh the additional capital and operating costs associated with said three stage operation. As a result, such three stage operation of the invention, without the use of a deoxo treatment, provides an attractive alternative to the use of two membrane stages together with a deoxo unit, other than for the production of nitrogen at ultra-high purity levels, such as 99.999% nitrogen product purity.

In the practice of the invention, the non-permeate gas from the second membrane stage is passed to a third membrane stage instead of to a catalytic reaction unit for the catalytic reaction of residual amounts of permeate gas therein. In conventional practice for air separation for example, the second stage non-permeate gas commonly contains residual oxygen permeate gas in amounts within the range of from about 1% to 2%, and a deoxo unit is employed to react such residual oxygen with hydrogen or with a fuel gas. While the invention obviates the need for such conventional deoxo treatment, it will be appreciated that the high or very high purity product gas obtained in the practice of the invention may, optionally, be subject to post cleanup techniques, such as adsorption/chemical/or absorption techniques for the removal of trace amounts of permeate gas therefrom. In air separation processing, such techniques, e.g. the use of adsorbent beds, can be used to remove trace amounts of oxygen from the nitrogen product, generally to remove oxygen present in amounts of about 0.5% or less, more typically of about 0.1% or less.

Various changes and modifications can be made in the details of the membrane process and system herein described without departure from the scope of the invention as recited in the appended claims. Thus, while hollow fiber membranes are generally preferred, other membrane configurations can be employed, e.g. spiral wound membranes. While the latter type of membranes tend to perform in accordance with the model for cross-flow type permeation, with not particularly impressive performance, the use of the three stage approach of the invention provides such membranes with more of the desirable attributes of countercurrent type permeation, thereby improving the performance thereof. In the practice of the invention, the gas flow patterns employed can be of the cross-flow type or can be of the generally more preferred countercurrent flow type. Using the highly advantageous hollow fiber membrane configurations, the feed flow can either be inside-out, in which the feed air is passed to the bores of the hollow fibers for passage therethrough to the shell side of the membrane bundle, or outside-in, with passage of the feed air to the outside surface of the membrane bundle and Permeate gas being recovered from the bores of the hollow fiber. In order to establish a countercurrent flow pattern between the gas within the bores of the hollow fibers and the gas on the outer surface of the membrane bundles, the hollow fiber bundles can be encased within an impervious barrier over the entirety of its longitudinal outer surface, except for a non-encased circumferential area for gas flow in or out of the system as shown in European Patent Application Publication No. 0226431, published June 24, 1987.

The hollow fiber or other desirable membranes employed in the practice of the invention may comprise either composite membranes or asymmetric membranes. Composite type membranes have a very thin separation layer deposited on a porous substrate. The separation layer, which determines the selectivity characteristics of the membrane can be any desired membrane material, such as ethyl cellulose, cellulose acetate or the like, deposited on a convenient substrate material, such as polysulfone. Asymmetric membranes comprise one material, e.g., polysulfone, with two separate morphological regions, one comprising a thin, dense skin region that determines the selectivity characteristics of the membrane, and a less dense, porous support region. Both types of membranes can have variables therein, as by the treatment with other coating materials to cure defects therein and the like.

While the invention has been described above particularly with respect to the use of a three stage membrane system for air separation in the production of very high purity nitrogen product gas, it will be understood that the invention can also be used for the separation of other gas mixtures wherein it is desired to achieve the enhanced separation and recovery of the less selectively permeable components of the mixtures. The more valuable the less selectively permeable component may be, the more importance will be attached to its production at high recovery levels, as is obtainable in the practice of the invention. The recovery of argon, as the less selectively permeable component, from mixtures thereof with oxygen is an example of a commercially significant gas separation operation that can be achieved in the practice of the invention. Other suitable applications of the invention include the separation of methane from more permeable carbon dioxide, or from nitrogen in tertiary oil recovery operations, and the separation of rare gases, such as neon, krypton and xenon, from mixtures thereof with common, more selectively permeable impurities. In such applications, as in the embodiments referred to above with respect to the production of high and very high purity nitrogen, the third stage permeate is compressed and recycled to the second stage, and the area distribution between the first, second and third stage is as described herein. The surface area distribution indicated above with respect to air separation will generally be understood to pertain with respect to such other desirable gas separations. The separation factors of the membrane materials used for such non-air separation applications will generally be in the range of from about 2 to about 12 referred to above, but those skilled in the art will appreciate that for particular separations, such as methane from carbon dioxide, separation factors much higher than these are commonly employed and two stage systems may be preferable in such cases.

Because of their inherent simplicity and advantages, gas separation membranes are highly desired for a wide variety of industrial gas separation applications, such as the need for separating air to produce nitrogen efficiently at very high purity levels and with enhanced product recovery levels. By enabling membranes to satisfy such requirements, including the capability of doing so while eliminating the need for separate deoxo treatment, the invention serves in a significant manner to broaden the scope of application of the highly desirable membrane technology in addressing the ever-increasing needs of modern industrial activities.

I claim:

1. An improved membrane process for the production at high or very high purity of the less selectively permeable component of a feed gas mixture containing said component and a more selectively permeable component comprising:

(a) introducing the feed gas mixture at a feed pressure to the first stage of a membrane system containing at least three stages, said system being capable of selectively permeating the more selectively permeable component thereof, said membrane system containing membrane material having a separation factor for the more selectively permeable component/less selectively permeable component of from about 2 to about 12, the proportion of the total membrane surface area included in the first and second of said three stages being more at higher separation factors in said range and less at lower separation factors in said range;

(b) separately removing the less selectively permeable component from said first stage at the feed pressure as non-permeate gas, and the more selectively permeable component therefrom at a permeate pressure lower than the feed pressure as permeate gas;

(c) passing said non-permeate gas from the first stage to the second stage of said membrane system at the feed pressure as feed gas thereto;

(d) separately removing the less selectively permeable component from said second stage as non-permeate gas at the feed pressure, and the more selectively permeable component therefrom at a permeate pressure lower than the feed pressure as permeate gas;

(e) recycling said permeate gas from the second stage for passage to the first stage of the membrane system at the feed pressure, together with additional quantities of said feed gas mixture;

(f) passing said non-permeate gas from the second stage to the third stage of said membrane system at the feed pressure as feed gas thereto without passage to a catalytic reaction unit for the catalytic reaction of residual permeate gas therein;

(g) separately removing the less selectively permeable component from said third stage at the feed pressure as non-permeate gas, and the more selectively permeable component therefrom at a permeate pressure lower than said feed pressure as permeate gas, the surface area distribution between said three membrane stages being such that the concentration of the more selectively permeable component in the third stage permeate gas is less than the non-permeate gas from the first stage, and the concentration of the more selectively permeable component in the second stage permeate gas is less than that in the gas introduced to the first stage;

(h) compressing the third stage permeate gas and recycling said permeate gas to the second stage of the membrane system at the feed pressure for passage to the second stage of the membrane system at the feed pressure, together with additional quantities of non-permeate gas from the first stage; and (i) recovering the third stage non-permeate gas as high or very high purity gas, without non-membrane treatment for the removal of residual amounts of the more selectively permeable component therefrom, whereby the less readily permeable component is advantageously recovered as a high or very high purity product gas at enhanced recovery levels.

2. The process of claim 1 in which said membrane system contains three stages.

3. The process of claim 2 and including compressing said feed gas mixture and said second stage permeate gas to the feed pressure prior to introduction thereof to the first stage of said membrane system.

4. The process of claim 3 in which the surface area distribution between the three membrane stages comprises: (1) for the first stage, a range of from about 8% to about 45% at a separation factor of about 4 to from about 20% to about 64% at a separation factor of about 10; (2) for the second stage, a range of from about 10% to about 30% for a separation factor of about 4 to about 20% to 30% for a separation factor of about 10; and (3) for the third stage, the difference between the total of the first and second surface area distribution and the total membrane surface area of the three stages.

5. The process of claim 1 in which said feed air mixture comprises air, the more selectively permeable component comprises oxygen, and the less selectively permeable component comprises nitrogen.

6. The process of claim 5 in which said nitrogen is recovered as the desired product gas at a purity of from about 99% to about 99.9%.

7. The process of claim 1 in which said feed gas mixture comprises a mixture of argon as the less selectively permeable component and oxygen as the more readily permeable component.

8. An improved membrane system for the production at high or very high purity of the less selectively permeable component of a feed gas mixture containing said component and a more selectively permeable component comprising:

(a) a membrane system containing at least three stages and capable of selectively permeating the more selectively permeable component of said feed gas mixture, said membrane system containing membrane material having a separation factor for the more selectively permeable component/less selectively permeable component of from about 2 to about 12, the proportion of the total membrane surface area included in the first and second of said three stages being generally greater at higher separation factors in said range and generally less at lower separation factors therein, the surface area distribution between said three membrane stages being such that the concentration of the more selectively permeable component in the third stage permeate gas is less than that in the first stage non-permeate gas passed to the second stage, and the concentration of the more selectively permeable component in the second stage is less than that in the gas introduced to the first stage;

(b) conduit means for introducing the feed gas mixture at a feed pressure to the first stage of the membrane system;

(c) conduit means for separately removing the less selectively permeable component from the first stage at the feed pressure as non-permeate gas, and the more selectively permeable component therefrom at a permeate pressure lower than the feed pressure as permeate gas, said conduit means including means to pass said non-permeate gas from the first stage to the second stage of the membrane system at the feed pressure as feed gas thereto;

(d) conduit means for separately removing the less selectively permeable component from said second stage as non-permeate gas at the feed pressure, and the more selectively permeable component therefrom at a permeate pressure lower than the feed pressure as permeate gas, said conduit means including means to pass said non-permeate gas from the second stage to the third stage of the membrane system at the feed pressure as feed gas thereto, without passage to a catalytic reaction unit for the reaction of residual permeate gas therein; and including means to recycle said permeate gas from the second stage for passage to the first stage of the membrane system at the feed pressure, together with additional quantities of said feed gas mixture;

(e) conduit means for separately removing the less selectively permeable component from said third stage as non-permeate gas at the feed pressure, and the more selectively permeable component therefrom at a permeate pressure lower than the feed pressure as permeate gas, said conduit means including means to recycle said permeate gas from the third stage for passage to the second stage of the membrane system at the feed pressure, together with additional quantities of said first stage non-permeate gas, said non-permeate gas from the third stage comprising high or very high purity gas; and (f) compression means for compressing said third stage permeate gas from a permeate pressure lower than the feed pressure to said feed pressure prior to passage to said second stage, whereby the less selectively permeable component may be advantageously recovered as a high or very high purity product gas at enhanced recovery levels.

9. The system of claim 8 in which said membrane system contains three stages.

10. The system of claim 9 and including compression means for compressing said feed gas mixture and said second stage permeate gas to the permeation pressure prior to introduction thereof to the first stage of said membrane system.

11. The system of claim 9 in which said membrane system comprises an air separation membrane system.

12. The system of claim 9 in which said membrane system comprises a system for the separation of argon from oxygen.

13. The system of claim 9 in which the surface area distribution between the three membrane stages comprises: (1) for the first stage, a range of from about 8% to about 45% at a separation factor of about 4 to from about 20% to about 64% at a separation factor of about 10; (2) for the second stage, a range of from about 10% to about 30% for a separation factor of about 4 to about 20% to about 30% for a separation factor of about 10; and (3) for the third stage, the difference between the total of the first and second surface area distribution and the total membrane surface area of the three stages.

14. The system of claim 13 in which said membrane system comprises an air separation system.

15. The system of claim 13 in which said membrane system comprises a system for the separation of argon from oxygen.

* * * * *